Feb. 14, 1967   J. D. JENKS ET AL   3,304,482
ELECTROMECHANICAL OSCILLATOR WITH VARIABLE DUTY CYCLE
Original Filed Nov. 21, 1962   2 Sheets-Sheet 1

OLE K. NILSSEN
JOHN D. JENKS
INVENTORS

BY John R. Faulkner
Keith L. Berschling

ATTORNEYS

OLE K. NILSSEN
JOHN D. JENKS
INVENTORS

United States Patent Office 3,304,482
Patented Feb. 14, 1967

3,304,482
ELECTROMECHANICAL OSCILLATOR WITH VARIABLE DUTY CYCLE
John D. Jenks, Dearborn, and Ole K. Nilssen, Livonia, Mich., assignors to Ford Motor Company, Dearborn, Mich., a corporation of Delaware
Continuation of application Ser. No. 239,153, Nov. 21, 1962. This application Sept. 24, 1965, Ser. No. 505,085
3 Claims. (Cl. 318—330)

This application is a continuation of our copending application S.N. 239,153, filed November 21, 1962, now abandoned.

This invention relates to an electrical system for periodically energizing an electrical load from a source of direct current electrical energy and more particularly to a system incorporating an electromechanical oscillator, the duty cycle of which can be varied over wide limits.

To vary the power supplied to an electrical load, for example, an electrical motor, from a source of direct current electrical energy, it has been the ordinary practice to place a variable resistor in series with the armature of the motor. This system has the disadvantage of continuously dissipating energy in the resistor while the motor is energized.

In the present invention an electromechanical oscillator is provided that periodically energizes the motor from the source of electrical energy through a very negligible resistance. Thus, when a large amount of energy is supplied to the motor, the power dissipated is very low. This electromechanical oscillator includes a means for varying the duty cycle so that the energization of the electrical motor can be controlled over wide limits.

In the preferred forms of the invention this means for varying the duty cycle takes the form of a means for exerting an auxiliary force on the movable arm of the electromechanical oscillator. The solenoid or electromagnetic means that is employed to move the arm of the electromechanical oscillator from one position, in which the motor is not energized, to another position, in which the motor is energized, is so designed that it develops insufficient force to perform this function. An additional force is, therefore, supplied to aid the force generated by the electromagnetic means or solenoid. The means for producing this auxiliary force includes a means for adjusting the magnitude of the force. Such a means may take the form of an auxiliary spring the force of which can be varied by means of a rotatable cam, or it may take the form of an auxiliary or secondary electromagnetic means or solenoid that is energized through a variable resistor. The greater the force applied by this auxiliary force means, the greater will be the time that the electromechanical oscillator supplies electrical energy to the motor or other load during each cycle of operation. Thus, the greater the force applied by the auxiliary force means the greater will be the duty cycle of the electromechanical oscillator and hence the greater will be the average power supplied to an electrical motor or other load.

This electromechanical oscillator can also be used to great advantage in an electrical system in which a load is energized through a transistor. In this case, the electromechanical oscillator includes a transistor that is alternately switched between fully conducting and fully non-conducting states. This permits the transistor to operate in an area where it dissipates very little energy and where its efficiency is greatly improved.

An object of the invention is the provision of a means for controlling efficiently the energization of a load from a source of direct current electrical energy.

Another object of the invention is the provision of an electrical system for controlling the energy supplied to a load from a source of direct current electrical energy in which the energy dissipated in the control system has been reduced to a minimum.

Another object of the invention is the provision of a system for controlling the energy supplied to a load from a source of direct current electrical energy in which the load is periodically energized by pulsating electrical current and in which the duty cycle of the means for supplying the pulsating electrical current can be varied over wide limits.

Other objects and attendant advantages of the present invention will become more apparent as the specification is considered in connection with the attached drawings in which.

Figure 1:
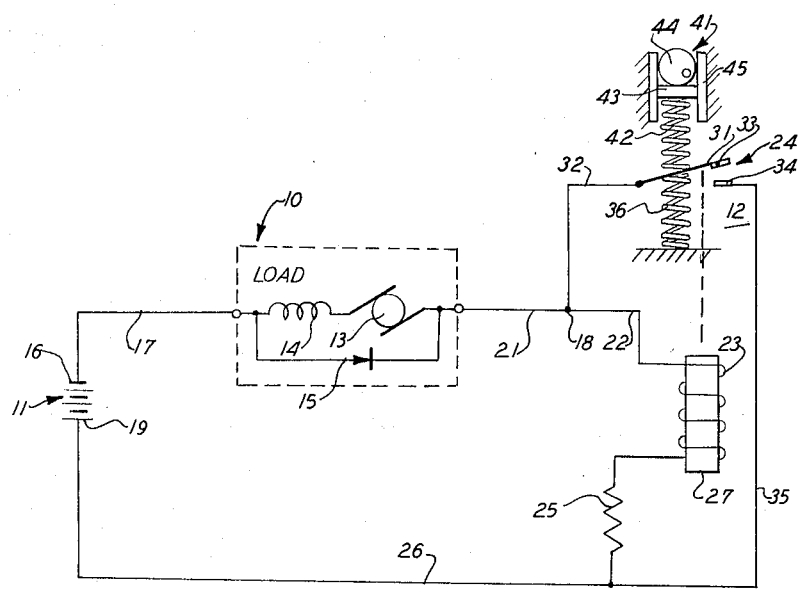
FIGURE 1 is a circuit diagram of one embodiment of the invention.

Referring now to the drawings in which like reference numerals designate like parts throughout the several views thereof, there is shown in FIGURE 1 an electrical circuit or system for periodically energizing a load 10 from a source of direct current electrical energy which may take the form of a storage battery 11. The periodic energization of the load 10 from the source of direct current electrical energy or battery 11 is controlled by an electromechanical oscillator, generally designated by the numeral 12. As defined in this specification the electromechanical oscillator 12 includes all of the circuit components except the load 10 and the battery 11. This applies to the embodiments shown in FIGURES 2 through 4 as well as the embodiment of FIGURE 1.

In the invention, the load 10 may comprise an electrical motor, designated by the numeral 13, that has a certain amount of series inductance represented at 14. The motor 13, including the inductance 14, is shunted by a diode 15 that promotes efficiency of the electric motor and that reduces transients that are caused by the periodic energization of the motor 13, including the inductance 14.

One terminal, for example, negative terminal 16 of the storage battery 11, is connected to the load 10 through a lead 17. The other terminal of the load is connected to a junction 18 through a lead 21, and the junction 18 is connected to the electromechanical oscillator 12 as will now be described. The junction 18 is connected through a lead 22 to a solenoid or winding 23 that forms a part of an electromechanical switch or relay 24. The electromechanical switch or relay 24 forms the basic structure of the electromechanical oscillator 12. The solenoid 23 is also connected to the other or positive terminal 19 of the battery 11 through a resistor 25 and a lead 26. The solenoid or winding 23 may be wound upon a core 27 of magnetic material as is conventional in the electrical arts.

The junction 18 is also connected to an arm or armature 31 of the electromechanical switch or relay 24 through a lead 32. The arm 31 includes a contact 33 that is adapted to engage a fixed contact 34. The fixed contact 34 is directly connected to the lead 26 and hence to the terminal 19 of the battery 11 through a lead 35. The armature 31 is biased to its open position, where contacts 33 and 34 are not in engagement, by a spring represented in diagrammatic form at 36. As is conventional in the art, the energization of the solenoid 23 generates a magnetic force that tends to move the armature 31 downwardly against the bias of the spring 36 so that the contacts 33 and 34 come into engagement. As will be more fully explained subsequently, when the operation of the circuit is described, the force exerted by the solenoid 23 is insufficient in relation to the force exerted by the spring 36 to move the arm 31 so that the contacts 33 and 34 come into engagement.

A means for exerting an auxiliary or secondary force is coupled to the arm 31. This means is generally designated by the numeral 41, and it exerts a force in the same direction as the force exerted by the solenoid 23. This means includes a spring 42 that engages the arm 31 and that engages a follower 43 of a cam 44. The spring and follower may be suitably housed for movement in a housing 45. It is apparent, therefore, that as the cam is rotated in a counterclockwise direction the auxiliary force exerted by the spring 42 on the arm or armature 31 increases. As will be explained more fully subsequently, this will increase the duty cycle of the electromechanical oscillator 12.

Figure 2:
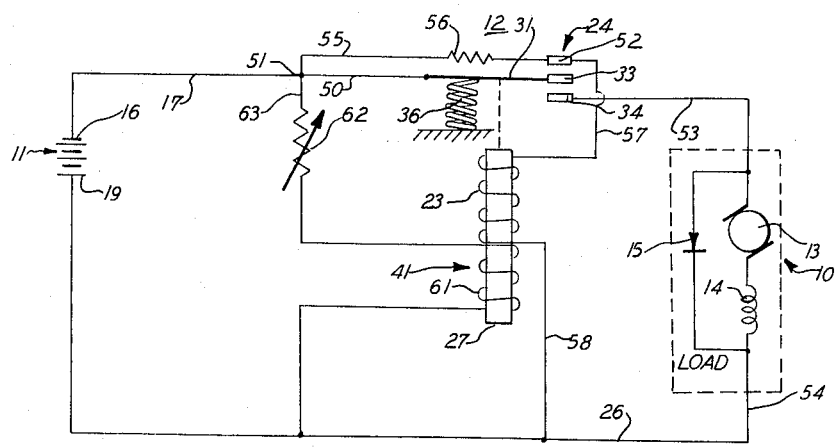
FIGURE 2 is a circuit diagram of another embodiment of the invention.

FIGURE 2 discloses another embodiment of the invention in which the electromechanical oscillator 12 takes a different form and in which the secondary or auxiliary force means acting on the movable arm or armature 31 of the electromechanical switch or relay 24 also takes a different form. In this embodiment of the invention a junction 51 is connected to the terminal 16 of the battery 11 through a lead 17. The electromechanical switch means or relay 24 is of the double contact type and it employs an additional stationary contact 52 positioned above the contact 33 on the movable arm or armature 31. One terminal of the load 10 is connected to the stationary contact 34 through a lead 53 while the other terminal of the load is connected to the lead 26 and the terminal 19 of the battery 11 through a lead 54. The junction 51 is connected to stationary contact 52 through a lead 55 and a resistor 56. The junction 51 is also connected to the movable arm or armature 31 through a lead 50. The stationary contact 52 is connected to solenoid 23 through a lead 57, while the other end of the solenoid 23 is connected to lead 26 through a lead 58.

The auxiliary or secondary force means 41 that acts in the direction of the magnetic force generated by the solenoid 23 includes a secondary solenoid or winding 61 positioned upon the core 27 of the solenoid 23. This secondary solenoid or winding 61 is energized from the terminal 16 of the battery or source of direct current electrical energy 11 through a variable resistor 62 that is connected to the junction 51 by a lead 63.

Figures 3, 4:
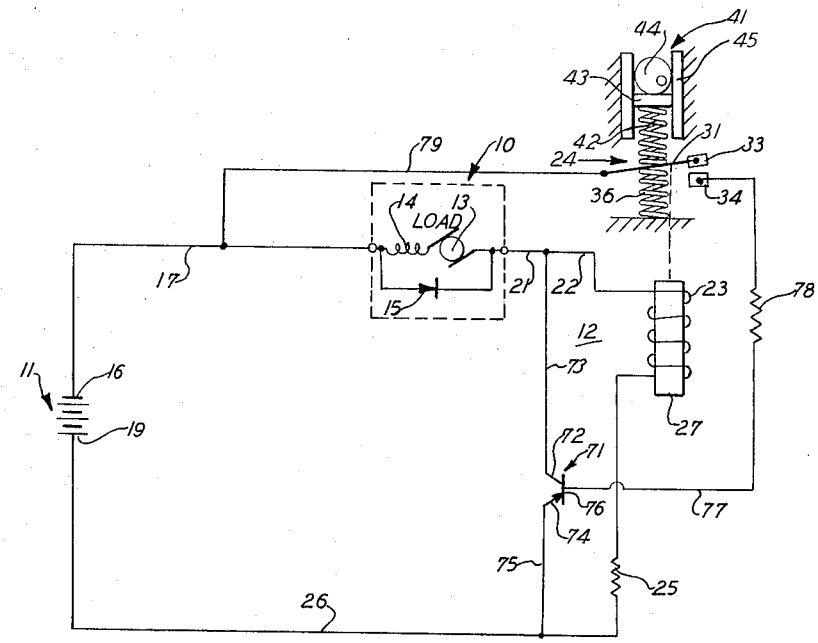
FIGURE 3 is a circuit diagram of still another embodiment of the invention in which a transistor is employed.
FIGURE 4 is another embodiment of the basic circuit shown in FIGURE 3.

FIGURE 3 discloses another embodiment of the invention in which the electromechanical oscillator 12 includes a transistor 71. In this embodiment the load is energized periodically through the transistor 71 that is switched alternately between fully nonconducting and fully conducting states. As shown in FIGURE 3, the transistor 71 is of the PNP type and it has a collector 72 that is connected to one terminal of the load 10 through a lead 73 and the lead 21. The emitter 74 of the transistor is connected to the lead 26, and hence the positive terminal 19 of the battery 11 through a lead 75. The base 76 of the transistor is connected to the stationary contact 34 of the electromechanical switch or relay 24 through a lead 77 and a bias resistor 78. The movable arm 31 of the electromechanical switch or relay 24 is connected to the negative terminal 16 of the battery 11 through a lead 79 and the lead 17. In other respects the embodiment shown in FIGURE 3 is similar to that shown in FIGURE 1.

FIGURE 4 discloses a circuit, similar to that shown in FIGURE 3, in which a load is energized through an electromechanical oscillator that includes a transistor. In this embodiment, the auxiliary force means takes the form of a secondary or auxiliary solenoid or winding positioned on the core 27 of the electromagnetic switch means or relay 24. In this respect the embodiment shown in FIGURE 4 is similar to that shown in FIGURE 2. In this embodiment, the secondary winding or solenoid 61 is connected to the lead 26 through a lead 81, and is also connected to the variable resistor 62 through a lead 82.

The operation of the electrical systems of the invention will now be described. Referring first to the embodiment shown in FIGURE 1, when the source of direct current electrical energy or battery 11 is connected into the circuit, the solenoid 23 will be energized through the lead 17, the load 10, the lead 21 and the lead 22. Electrical energy flows from the solenoid back to the battery 11 through the resistor 25 and the lead 26. At this time, the load will be energized at a low level because of the resistance in the solenoid 23 and the resistor 25 which is of sufficiently high value to prevent high energization of the load. The magnetic force generated by the current flow through the solenoid 23 when it is fully energized is designed to be insufficient in itself to close the contacts 33 and 34 by movement of the arm 31 against the force of the spring 36. However, the auxiliary force means 41, including the spring 42 and the cam and follower 43 and 44, exerts an additional force on the arm so that the contacts 33 and 34 close when the solenoid 23 is energized. The closing of the contacts 33 and 34 short circuits the solenoid 23 and the resistor 25, since a current path of negligible resistance is provided from the load to the lead 26 through the junction 18, lead 32, arm 31, contacts 33 and 34, and lead 35. Since the resistance or impedance of the solenoid 23 and resistor 25 is shorted out of the circuit the amount of electrical energy flowing through the load is greatly increased. When the solenoid 23 is shorted out of the circuit by the closing of contacts 33 and 34 it will be de-energized and the movable arm 31 will immediately return to its original position under the impetus of spring 36, thereby opening contacts 33 and 34. This places the solenoid 23 and the resistor 25 back in the circuit in series with the load and the solenoid 23 is energized, thereby again closing contacts 33 and 34. This cycle repeats periodically at a rate dependent upon the electrical and mechanical parameters of the components involved.

The duty cycle of the electromechanical oscillator 12 can be varied by turning the cam 44 so that the compression of the spring 42 is varied thus varying the force on the movable arm 31. It can be appreciated that the pulsating current flow through the load is essentially in the form of a plurality of rectangular pulses due to the direct switching action of the electromechanical switch or relay 24. In a pulse system such as this, the duty cycle is defined as the ratio of the pulse width (measured in time) to the pulse repetition period. If the force applied by the auxiliary force means 41, including spring 42, is low, the amount of time that the load is energized during each cycle is small. Stated in another way, the width of each pulse of high current energy energizing the load is small compared to the pulse repetition period and hence the duty cycle is small. As the cam is rotated to increase the force applied to the arm 31, the pulse width is increased, and hence the duty cycle of the electromechanical oscillator 12 is increased. This increases the average power supplied to the load 10.

It can be readily appreciated that the operation of the circuit shown in FIGURE 2 is quite similar to that shown in FIGURE 1. In this case, however, the spring 36 biases the contact 33 on the movable arm 31 into engagement with the stationary contact 52. The auxiliary force, as explained previously, comprises an electromagnetic force generated by the auxiliary solenoid or winding 61 wound upon the core 27. This force may be varied by varying the variable resistor 62.

Assuming that the circuit is initially energized when the contacts 52 and 33 are in engagement, the solenoid winding 23 will be energized from the battery 11 through the lead 17, junction 51, lead 50, arm 31, contact 33, stationary contact 52, and lead 57. This will cause the stationary arm 31 to move to the extent that the contact 33 comes out of engagement with contact 52 and comes into engagement with contact 34. This is done under the impetus of the electromagnetic force generated by the auxiliary or secondary solenoid 61 and the force generated by the solenoid 23. At this time the load 10 is directly energized from the battery 11 through the lead 17, lead 50, the arm 31, contact 33, contact 34, and lead 53. Previous to the engagement of contacts 33 and 34 the load 10 is open circuited, since there is no connection between it and the battery 11. It can be seen that when the contact 33 disengages from contact 52 that the solenoid 23 is energized through the resistor 56. The resistor 56 is made sufficiently large so that the current through the solenoid 23 is reduced sufficiently to permit the spring 36 to move the movable arm 31 back to its original position where the contact 33 engages the contact 52. This cycle will repeat indefinitely and as stated in relation to the operation of the circuit in FIGURE 1, the duty cycle can be varied by varying the auxiliary force on the arm or armature 31. This is accomplished in this embodiment by varying the resistance of the resistor 62 to vary the current flow through the auxiliary solenoid 61.

The operation of the circuit shown in FIGURE 3 is very similar to that shown in FIGURE 1 except that the electromechanical switch or relay 24 alternately switches the transistor 71 between fully conducting and fully nonconducting states. It can be readily appreciated that when the contacts 33 and 34 are open no current can flow from the emitter 74 through the base 76 since the base circuit is open. In this condition then the transistor is in a fully nonconducting state, and a series circuit is completed through the load 10, the solenoid 23, and the resistor 25. This will close the contacts 33 and 34, and provide the proper bias on the transistor 71 to cause it to conduct. The magnitude of this bias is made sufficient to turn the transistor to a fully conducting condition. When the transistor switches to its fully conducting state, the load 10 is energized from the battery 11 through the transistor 71. This is a high level of energization since the fully conducting transistor presents almost negligible resistance to current flow. At this time the transistor 71 short circuits the solenoid 23 and the movable arm 31 returns to its original position in which contacts 33 and 34 are out of engagement. The transistor 71 is then switched to its fully nonconducting state. In this embodiment then the transistor 71 alternates between the fully conducting and fully nonconducting states, thus periodically energizing the load through the series circuit comprising the emitter 74 and collector 72 or output electrodes of the transistor 71. The time that the transistor is turned to its fully conducting state during each period or cycle of operation and the duty cycle of the electromechanical oscillator 12 is again determined by the amount of force applied by the auxiliary force means 41.

The operation of the system shown in FIGURE 4 is substantially the same as that described in relation to the circuit shown in FIGURE 3, the only difference being the means for applying the auxiliary force to the arm 31 of the electromechanical switch or relay 24. In this case the auxiliary force is applied by the secondary or auxiliary solenoid 61 that is energized through the variable resistor 62. The amount of time, therefore, that the transistor is in the fully conducting state during each period or cycle of operation is a function of the amount of auxiliary force applied to the arm 31 by the secondary or auxiliary solenoid 61. When little or no resistance is placed in series with the secondary or auxiliary solenoid 61 by the variable resistor 62, a large force is exerted and the transistor will be switched to its fully conducting state for a majority of the time during each cycle. When the resistance 62 is increased the electromagnetic force of the secondary or auxiliary solenoid 61 is decreased and the amount of time that the transistor is switched to its fully conducting state during each cycle will be reduced.

It should be apparent to those skilled in the art that the means for varying the duty cycle of the electromechanical oscillator 12 may take other forms. For example, a means for varying the force applied by the spring 36 to the movable arm or armature 31 could be employed, such as a cam and follower. In such a case, the solenoid 23 would need to develop sufficient magnetic force to close the contacts 33 and 34 against the largest force applied by the spring 36. As the force applied by the spring 36 is reduced through the manipulation of the cam and follower, for example, the duty cycle of the electromechanical oscillator would be increased.

Thus, in all of the embodiments of the invention, as shown in FIGURES 1 through 4, the load 10 is periodically energized from the source of direct current electrical energy 11 through a circuit of negligible resistance. The amount of time that the load is energized through such a circuit during each cycle of operation is dependent upon the force applied upon the movable arm or armature of an electromechanical oscillator. This means may take the form of an auxiliary spring with an adjusting cam arrangement or the form of an auxiliary solenoid the magnetic force of which can be adjusted through a variable resistor. By energizing the load periodically through a circuit having negligible resistance, losses in the control circuit are not of a large magnitude.

The present invention thus provides an efficient means for controlling the energization of a load from a source of direct current electrical energy in which the losses through the control system are reduced to a minimum.

It will be understood that the invention is not to be limited to the exact construction shown and described, but that various changes and modifications may be made without departing from the spirit and scope of the invention as defined in the appended claims.

We claim:

1. In an electrical system, a source of direct current electrical energy, a load, a transistor including an emitter and a collector connected in series with said load and said source of electrical energy, said transistor including a base, electromechanical switch means for connecting said base to said source of electrical energy to bias said transistor into a fully conducting state when said electromechanical switch means is closed, said electromechanical switch means including a movable arm and a solenoid electromagnetically coupled to said movable arm, said solenoid connected in shunt with said transistor, means engaging said movable arm for biasing said switch to the open position, the electromagnetic force exerted by said solenoid when energized being insufficient to move said movable arm to the extent of closing said switch, and auxiliary means for applying a force at all times during the operation of the electrical system to said movable arm in a direction to close said switch, said auxiliary means including means for varying said force whereby said transistor is alternately switched from a conducting to a nonconducting state and said load is periodically energized with a duty cycle dependent upon the magnitude of the force applied by said auxiliary means.

2. In an electrical system, a source of electrical energy, a load, an electromechanical oscillator connected to said source of electrical energy and said load for periodically energizing said load, said electromechanical oscillator including an arm movable between a first position and a second position, said arm in said second position energizing said load at a higher level of electrical energy than when in said first position, said electromechanical oscillator including electromagnetic means for applying a force in a direction to move said arm from said first position to said second position, said force being insufficient to move said arm from said first position to said second position, and means coupled to said arm at all times during the operation of the electrical system for assisting said electromagnetic means to move said arm from said first position to said second comprising an auxiliary electromagnetic means coupled to said arm and connected at all times during the operation of the electrical system to said source of electrical energy, and a variable resistor connected in series with said source of electrical energy and said auxiliary electromagnetic means for varying the assistance applied by said auxiliary electromagnetic means.

3. In an electrical system for periodically energizing a load, a source of electrical energy, a transistor coupled to said source of electrical energy and to said load for controlling the energization of said load, said transistor including a control circuit, an electromechanical switch connected to said control circuit and to said source of electrical energy for energizing said transistor when closed, said switch being normally biased to an open position, a solenoid connected in parallel with said transistor, said solenoid acting to bias said switch to a closed position when energized but developing insufficient force to close said switch when energized, and means for applying a force at all times during the operation of the electrical system to said switch in a direction to aid the force of said solenoid comprising an auxiliary solenoid connected at all times during the operation of the electrical system to said source of electrical energy, and a variable resistor connected to said auxiliary solenoid and said source of electrical energy for varying said force whereby the time that said load is energized during each cycle of opening and closing of said switch is dependent on the magnitude of said force.

References Cited by the Examiner
UNITED STATES PATENTS

| | | | |
|---|---|---|---|
| 678,395 | 7/1901 | Ghegan | 317—176 |
| 2,437,428 | 3/1948 | Hornbostel | 318—330 |
| 2,892,954 | 6/1959 | Orlando | 307—132 |
| 3,083,279 | 3/1963 | Glass | 317—199 |
| 3,113,242 | 12/1963 | Leeder | 307—132 X |

ORIS L. RADER, *Primary Examiner.*

J. C. BERENZWEIG, *Assistant Examiner.*